United States Patent [19]
Gephardt et al.

[11] Patent Number: 5,388,218
[45] Date of Patent: Feb. 7, 1995

[54] APPARATUS AND METHOD FOR SUPPORTING A TRANSFER TRAPPING DISCIPLINE FOR A NON-ENABLED PERIPHERAL UNIT WITHIN A COMPUTING SYSTEM

[75] Inventors: Douglas D. Gephardt; Andrew McBride, both of Austin, Tex.

[73] Assignee: Advanced Micro Devices, Inc., Sunnyvale, Calif.

[21] Appl. No.: 836,647

[22] Filed: Feb. 14, 1992

[51] Int. Cl.6 ............................................. G06F 15/02
[52] U.S. Cl. ..................... 395/275; 395/725; 364/221.7; 364/231.5; 364/264.6; 364/DIG. 1
[58] Field of Search ............ 395/275, 575, 800, 725, 395/750; 364/221.7, 231.5, 264.2, 264.6, 264.7, 267.6, 947.1, 228.5; 371/11.1, 7, 15.1, 16.5, 29.1, 48, 66

[56] References Cited
U.S. PATENT DOCUMENTS

| | | | |
|---|---|---|---|
| 4,591,973 | 5/1986 | Ferris et al. | 364/200 |
| 4,628,445 | 12/1986 | Bunonomo et al. | 364/200 |
| 4,841,440 | 6/1989 | Yonezu et al. | 364/200 |
| 4,922,491 | 5/1990 | Coale | 371/16.1 |
| 5,038,275 | 8/1991 | Dujari | 364/238.3 |
| 5,237,692 | 8/1993 | Raasch et al. | 395/725 |

Primary Examiner—Robert L. Richardson
Assistant Examiner—Moustafa M. Meky
Attorney, Agent, or Firm—Foley & Lardner

[57] ABSTRACT

An apparatus for managing communication within a computing system which includes a processing unit and a plurality of peripheral units. The processing unit receives information from a plurality of loci within the computing system and determines an enablement profile in response to such information according to predetermined criteria. The processing unit responds to the enablement profile to selectively enable specified peripheral units. The apparatus comprises a monitoring circuit for monitoring the enablement profile; a logic circuit for logically treating the enablement profile and generating a feedback signal representative of the enablement profile; and a transmission circuit for communicating the feedback signal from the logic circuit to the processing unit. The processing unit responds to the feedback signal to determine whether to employ a transfer trapping discipline whereby transfers destined for a non-enabled peripheral unit are stored until the non-enabled unit is enabled. The invention further comprises a method for managing communications within such a computing system comprising the steps of monitoring the enablement profile; generating a feedback signal representative of the enablement profile; communicating the feedback signal to the processing unit; and configuring the processing unit to respond to the feedback signal to determine whether to employ a transfer trapping discipline.

13 Claims, 3 Drawing Sheets

APPARATUS AND METHOD FOR SUPPORTING A TRANSFER TRAPPING DISCIPLINE FOR A NON-ENABLED PERIPHERAL UNIT WITHIN A COMPUTING SYSTEM

BACKGROUND OF THE INVENTION

In certain computing system configurations, especially in those configurations where conservation of supply power is of importance (e.g., battery-powered computers), the processing unit of the computing system receives information from various loci within the computing system to monitor employment of various associated peripherals and determine whether the system is on battery power or external power (AC power). The processing unit evaluates the various information thus received and, according to predetermined criteria, disables selected peripheral devices within the computing system.

For example, a failure to enter any keystroke entries on the keyboard for a predetermined time interval may result in disabling the display (e.g., the screen) until the display is further required. In such situations, any input/output (IO) transfer associated with a disabled peripheral device, cannot be sent to that disabled device until the device has been enabled and is able to receive the IO transfer. Such power preserving computing systems may employ what is known as an "IO trapping" discipline whereby an IO transfer destined for a disabled peripheral device is "trapped" (i.e., stored or otherwise held) until the system can effect re-enablement of the affected peripheral unit, and then releasing the IO transfer for delivery to the newly-enabled peripheral unit.

There is an inherent performance degradation in operation of such a system since time must be taken to check whether a given peripheral unit is enabled—a check which must be made no later than the end of a cycle period. Thus, even when all peripheral devices are enabled, an IO trapping discipline imposes inefficiencies in the response of the system.

It would be advantageous to limit application of an IO trapping discipline to only those situations or configurations in which it is necessary that such a discipline be imposed. For example, when all peripheral devices are enabled or when power is derived from an AC source, no IO trapping discipline is required or desired.

SUMMARY OF THE INVENTION

The present invention is an apparatus for managing communication within a computing system which selectively employs a transfer trapping discipline. The computing system includes a processing unit and a plurality of peripheral units. The processing unit receives information from a plurality of loci within the computing system and determines an enablement profile in response to such information according to predetermined criteria. The processing unit employs the enablement profile to selectively disable specified peripheral units. The apparatus comprises a monitoring circuit operatively connected with the processing unit for monitoring the enablement profile; a logic circuit operatively connected with the monitoring circuit for logically treating the enablement profile and generating a feedback signal representative of the enablement profile; and a transmission circuit for communicating the feedback signal from the logic circuit to the processing unit. The processing unit responds to the feedback signal to determine whether to employ a transfer trapping discipline whereby transfers destined for a non-enabled peripheral unit are stored until the non-enabled unit is enabled.

The invention further comprises a method for managing communications within such a computing system comprising the steps of monitoring the enablement profile; generating a feedback signal representative of the enablement profile; communicating the feedback signal to the processing unit; and configuring the processing unit to respond to the feedback signal to determine whether to employ a transfer trapping discipline whereby transfers destined for a non-enabled peripheral unit are stored until the non-enabled unit is enabled.

It is, therefore, an advantage of the present invention to provide an apparatus and method for managing communication within a computing system which facilitates selective employment of a transfer trapping discipline whereby transfers destined for a non-enabled peripheral unit are stored until the non-enabled unit is enabled.

Further advantages and features of the present invention will be apparent from the following specification and claims when considered in connection with the accompanying drawings illustrating the preferred embodiment of the invention.

DETAILED DESCRIPTION OF THE INVENTION

Figure 1:
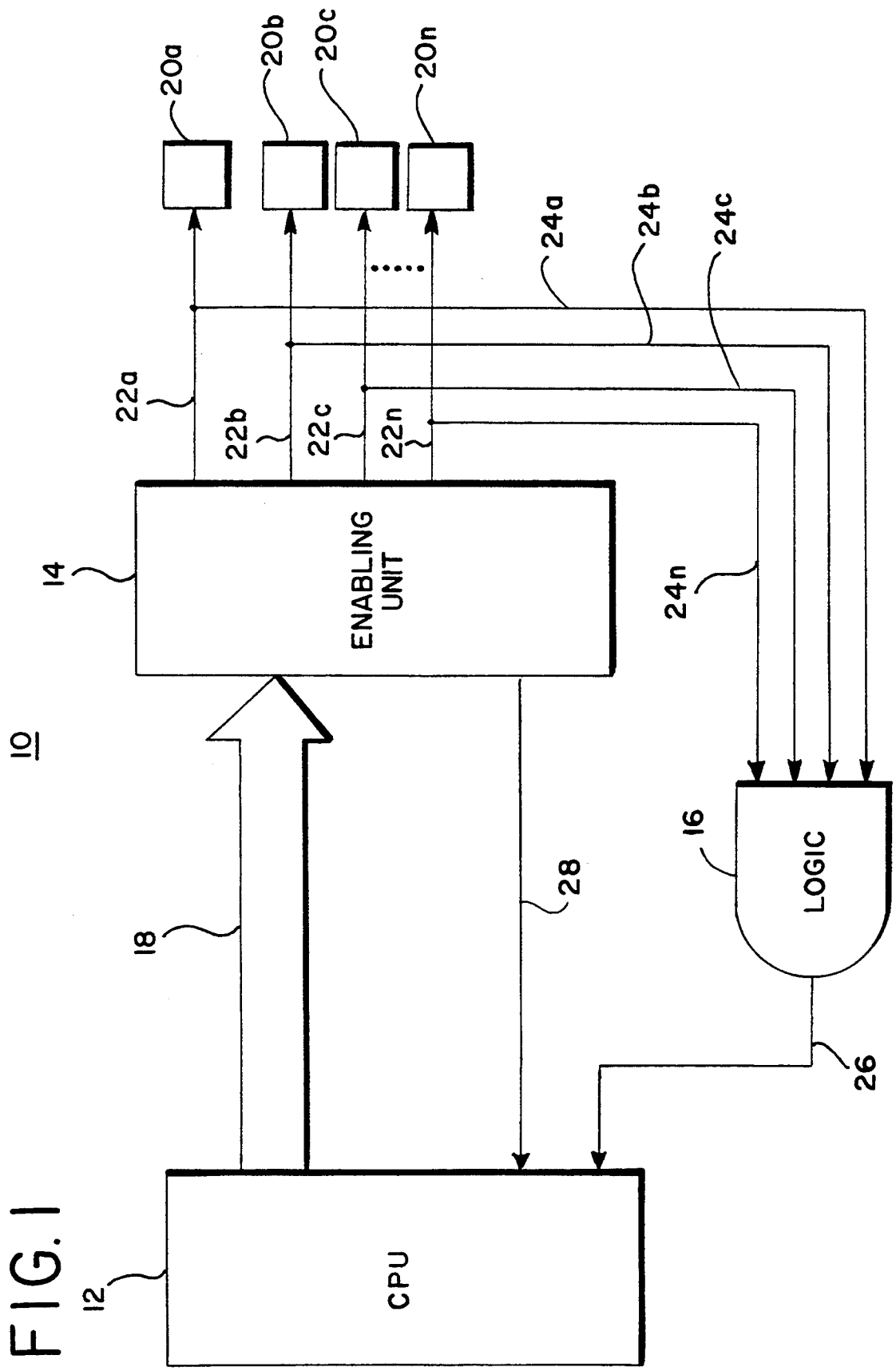
FIG. 1 is a schematic diagram of an embodiment of the present invention.

FIG. 1 is a schematic diagram of an embodiment of the present invention. In FIG. 1, a computing system 10 is illustrated including a processing unit 12, an enabling unit 14, and a logic unit 16. Processing unit 12 conveys information to enabling unit 14 via a transfer bus 18. Such information as is conveyed via transfer bus 18 preferably includes information regarding an enablement profile for a plurality of peripheral units $20_a$, $20_b$, $20_c$, ..., $20_n$ in appropriate detail to facilitate generation by enabling unit 14 of appropriate signals on enabling lines $22_a$, $22_b$, $22_c$, ..., $22_n$ to enable or disable peripheral units 20 according to the enablement profile conveyed via transfer bus 18. The enablement profile is established by the processing unit based upon a variety of information received by the processing unit from various loci (not shown) within computing system 10, according to predetermined criteria.

Logic unit 16 monitors the enablement profile conveyed from processing unit 12 to enabling unit 14 via transfer bus 18 by monitoring lines $24_a$, $24_b$, $24_c$, ... $24_n$, and generates a feedback signal at an output 26; output 26 is operatively connected with processing unit 12. The feedback signal at output 26 of logic unit 16 is representative of the enablement profile conveyed via transfer bus 18.

In the particular embodiment of the present invention illustrated in FIG. 1, logic unit 16 is an AND gate so that if any of the monitoring lines $24_a$, $24_b$, $24_c$, ..., $24_n$ indicates that its respective peripheral unit $20_a$, $20_b$, $20_c$, ... $20_n$ is not enabled, then the feedback signal at output 26 of logic unit 16 will indicate that not all peripheral units 20 are enabled. In such a situation, processing unit 12 will respond to the feedback signal at output 26 of logic unit 16 by invoking a transfer trapping discipline whereby transfers destined for a non-enabled peripheral unit are stored until that non-enabled unit is enabled. When the feedback signal indicates that all peripheral units are enabled, then no transfer trapping discipline is imposed.

As discussed above, such a transfer trapping discipline involves a predetermined "overhead" in terms of delay time thereby slowing operation of computing system 10 whenever the transfer trapping discipline is invoked. An advantage of the apparatus of the present invention in its employment with computing system 10 is to preclude employment of a transfer trapping discipline when all peripheral units 20 are enabled, thereby allowing speedier operation of computing system 10 at least during some periods of its operation (i.e., when all peripheral units 20 are enabled).

An additional input to processing unit 12 from enabling unit 14 (or from elsewhere within computing system 10) may be conveyed via a line 28 to indicate whether computing system 10 is powered by battery power or by external AC (alternating current) power. Such an input to processing unit 12 is preferable in employing the apparatus of the present invention with computing system 10 so that processing unit 12 may respond to an indication that computing system 10 is operating on AC power to independently preclude employment of a transfer trapping discipline. This is so because, when AC power is employed as a power source for computing system 10, no considerations regarding power conservation need impinge upon operation of computing system 10 so that there is no need for processing unit 12 to selectively disable peripheral units 20. That is, no transfer trapping discipline need be employed (and no inherent "overhead" time delay need be incurred) when AC power is employed.

Figure 2:
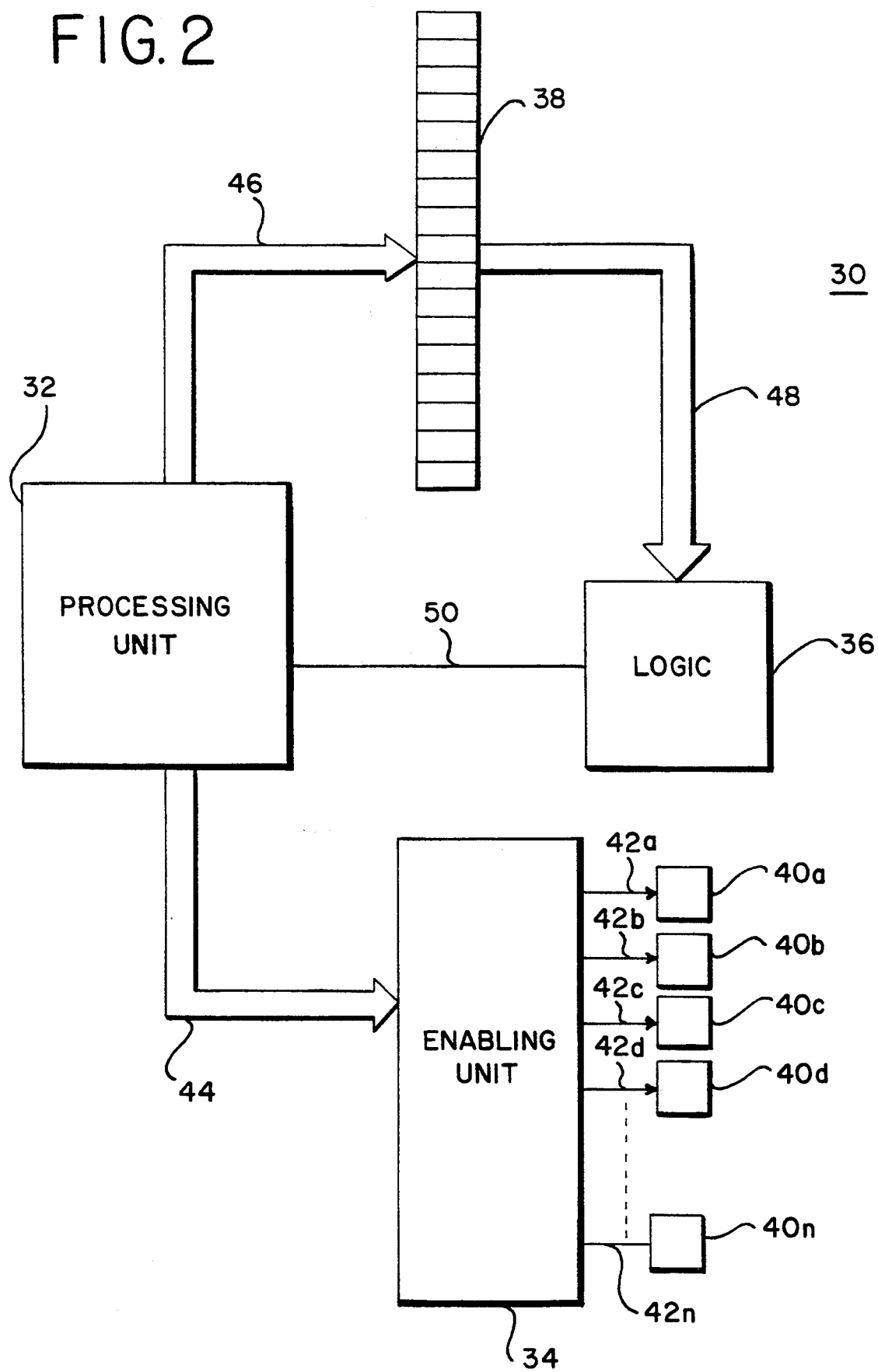
FIG. 2 is a schematic diagram of the preferred embodiment of the present invention.

FIG. 2 is a schematic diagram of the preferred embodiment of the apparatus of the present invention. In FIG. 2, a computing system 30 is illustrated including a processing unit 32, an enabling unit 34, a logic unit 36, and a monitoring unit 38. Enabling unit 34 provides enabling signals to peripheral units $40_a$, $40_b$, $40_c$, $40_d$, ... $40_n$ via enabling lines $42_a$, $42_b$, $42_c$, $42_d$, ... $40_n$.

Information about an enablement profile appropriate to facilitate operation of enabling unit 34 to selectively enable peripheral units 40 is conveyed from processing unit 32 to enabling unit 34 via a transfer bus 44. Processing unit 32 establishes the enablement profile according to predetermined criteria based upon information received from various loci (not shown) within computing system 30.

Monitoring unit 38 receives information about the enablement profile via an enablement bus 46; monitoring unit 38 preferably comprises a storage device appropriate to store information regarding each of peripheral devices 40. As will be recognized by one skilled in the art, monitoring unit 38, shown as a separate unit in FIG. 2, may be employed as a subunit of enabling unit 34, receiving enablement profile information via transfer bus 44 or may be an integral portion of processing unit 32.

Enablement profile information is conveyed from monitoring unit 38 to logic unit 36 via a monitoring bus 48, and logic unit 36 generates a feedback signal on a feedback line 50. The feedback signal is representative of the enablement profile conveyed from monitoring unit 38 via monitoring bus 48 to logic unit 36.

Processing unit 32 responds to the feedback signal conveyed via feedback line 50 to determine whether to employ a transfer trapping discipline. The feedback signal conveyed via feedback line 50 may include battery/AC power source information or a separate input (not shown) may convey an override feedback signal regarding such power source information to processing unit 32 in a manner similar to the provision of such a separate override feedback signal to processing unit 12 (see line 28 in FIG. 1).

Figure 3:
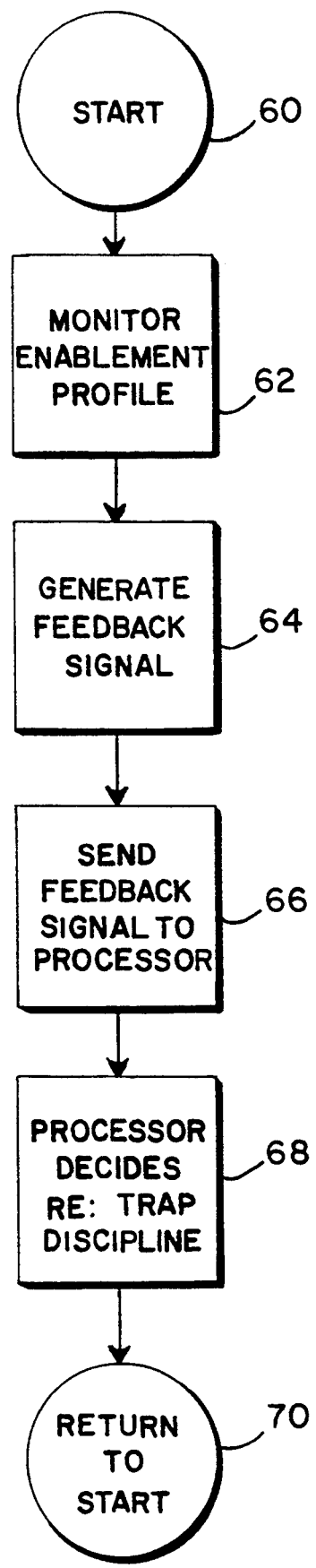
FIG. 3 is a flow diagram illustrating the method of the present invention.

FIG. 3 is a flow diagram illustrating the method of the present invention. In FIG. 3, the method starts with a start block 60 and, according to block 62, the enablement profile established by information received from a plurality of loci within the computing system is monitored. As indicated by block 64, the monitored enablement profile is employed to generate a feedback signal which is conveyed to the processing unit, as indicated by block 66. On receiving the feedback signal, the processing unit decides whether to employ a transfer trapping discipline according to predetermined criteria, as indicated by block 68. As one skilled in the art will recognize, the method must return to start, as indicated by block 70, in order that the information from the various loci within the computing system may constantly be monitored so that the enablement profile may be constantly updated, and the decision whether to employ a transfer trapping discipline may be constantly re-evaluated in order that the most efficient employment of a transfer trapping discipline (with its inherent "overhead" time delays) may be appropriately effected.

It is to be understood that, while the detailed drawing and specific examples given describe preferred embodiments of the invention, they are for the purpose of illustration, that the apparatus of the invention is not limited to the precise details and conditions disclosed and that various changes may be made therein without departing from the spirit of the invention which is defined by the following claims:

What is claimed is:

1. An apparatus for managing employment of a transfer trapping discipline in a computing system; said computing system including a processing unit, an enabling unit, and a plurality of peripheral units; said processing unit receiving information from a plurality of loci within said computing system and determining an enablement profile in response to said information according to predetermined criteria; said enabling unit being coupled with said processing unit and with said plurality of peripheral units and responding to said enablement profile to selectively enable specified peripheral units of said plurality of peripheral units; the apparatus comprising:

at least one storage means coupled with said processing unit for storing information, said information including said enablement profile;

a logic means coupled with said at least one storage means for logically treating said enablement profile according to a predetermined algorithm, said logic means generating a feedback signal representative of said enablement profile; and a transmission means for communicating said feedback signal from said logic means to said processing unit;

said processing unit responding to said feedback signal to determine whether to employ a transfer trapping discipline whereby transfers destined for a non-enabled peripheral unit are stored in said at least one storage means until said non-enabled unit is enabled.

2. An apparatus for managing employment of a transfer trapping discipline in a computing system as recited in claim 1 wherein said at least one storage means is coupled with said processing unit via said enabling unit.

3. An apparatus for managing employment of a transfer trapping discipline in a computing system as recited in claim 1 wherein said enabling unit is coupled with said plurality of peripheral units by a plurality of enabling transmission lines, and wherein the apparatus further comprises a plurality of monitoring transmission lines coupling said plurality of enabling transmission lines with said logic means.

4. An apparatus for managing employment of a transfer trapping discipline in a computing system as recited in claim 3 wherein said logic means comprises an AND gate.

5. An apparatus for managing employment of a transfer trapping discipline in a computing system; said computing system including a processing unit, an enabling unit, and a plurality of peripheral units; said processing unit receiving information from a plurality of loci within said computing system and determining an enablement profile in response to said information according to predetermined criteria; said enabling unit being coupled with said processing unit and with said plurality of peripheral units and responding to said enablement profile to selectively enable specified peripheral units of said plurality of peripheral units; the apparatus comprising:

at least one storage means coupled with said enabling unit for storing information, said information including said enablement profile;

a logic means coupled with said at least one storage means for logically treating said enablement profile according to a predetermined algorithm, said logic means generating a feedback signal representative of said enablement profile; and a transmission means for communicating said feedback signal from said logic means to said processing unit;

said processing unit responding to said feedback signal to determine whether to employ a transfer trapping discipline whereby transfers destined for a non-enabled peripheral unit are stored in said at least one storage means until said non-enabled unit is enabled.

6. An apparatus for managing employment of a transfer trapping discipline in a computing system as recited in claim 5 wherein said enabling unit is coupled with said plurality of peripheral units by a plurality of enabling transmission lines, and wherein the apparatus further comprises a plurality of monitoring transmission lines coupling said plurality of enabling transmission lines with said logic means.

7. An apparatus for managing employment of a transfer trapping discipline in a computing system as recited in claim 6 wherein said logic means comprises an AND gate.

8. An apparatus for managing employment of a transfer trapping discipline in a computing system; said computing system including a processing unit and a plurality of peripheral units; said processing unit receiving information from a plurality of loci within said computing system and determining an enablement profile in response to said information according to predetermined criteria; said processing unit responding to said enablement profile to selectively enable specified peripheral units of said plurality of peripheral units; the apparatus comprising:

at least one storage means coupled with said processing unit for storing information, said information including said enablement profile;

a logic means coupled with said at least one storage means for logically treating said enablement profile according to a predetermined algorithm, said logic means generating a feedback signal representative of said enablement profile; and a transmission means for communicating said feedback signal from said logic means to said processing unit;

said processing unit responding to said feedback signal to determine whether to employ a transfer trapping discipline whereby transfers destined for a non-enabled peripheral unit are stored in said at least one storage means until said non-enabled unit is enabled.

9. An apparatus for managing employment of a transfer trapping discipline in a computing system as recited in claim 8 wherein said processing unit is coupled with said plurality of peripheral units by a plurality of enabling transmission lines, and wherein the apparatus further comprises a plurality of monitoring transmission lines coupling said plurality of enabling transmission lines with said logic means.

10. An apparatus for managing employment of a transfer trapping discipline in a computing system as recited in claim 9 wherein said logic means comprises an AND gate.

11. A method for managing employment of a transfer trapping discipline in a computing system; said computing system including a processing unit an enabling unit, at least one storage unit, and a plurality of peripheral units; said processing unit receiving information from a plurality of loci within said computing system and determining an enablement profile in response to said information according to predetermined criteria; said enabling unit being coupled with said processing unit and with said plurality of peripheral units and responding to said enablement profile to selectively enable specified peripheral units of said plurality of peripheral units; the method comprising the steps of:

storing said enablement profile in said at least one storage unit;

employing a logic circuit for logically treating said enablement profile according to a predetermined algorithm and generating a feedback signal representative of said enablement profile; and communicating said feedback signal from said logic circuit to said processing unit;

said processing unit responding to said feedback signal to determine whether to employ a transfer trapping discipline whereby transfers destined for a non-enabled peripheral unit are stored in said at least one storage unit until said non-enabled unit is enabled.

12. A method for managing employment of a transfer trapping discipline in a computing system as recited in claim 11 wherein said logic circuit comprises an AND gate.

13. A method for managing employment of a transfer trapping discipline in a computing system; said computing system including a processing unit, an enabling unit, at least one storage unit, and a plurality of peripheral units; said processing unit receiving information from a plurality of loci within said computing system and determining an enablement profile in response to said information according to predetermined criteria; said enabling unit being coupled with said processing unit and with said plurality of peripheral units and responding to said enablement profile to selectively enable specified peripheral units of said plurality of peripheral units; the method comprising the steps of:

storing said enablement profile in said at least one storage unit;

generating a feedback signal representative of said enablement profile;

communicating said feedback signal to said processing unit; and configuring said processing unit to respond to said feedback signal to determine whether to employ a transfer trapping discipline whereby transfers destined for a non-enabled peripheral unit are stored in said at least one storage unit until said non-enabled unit is enabled.

* * * * *